June 20, 1950 G. A. DIKE ET AL 2,512,092
MACHINE FOR MOLDING CONCRETE BLOCKS
Filed Dec. 29, 1945 3 Sheets-Sheet 2

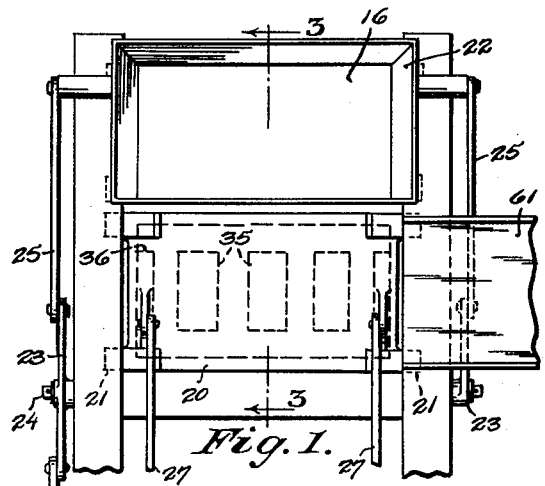
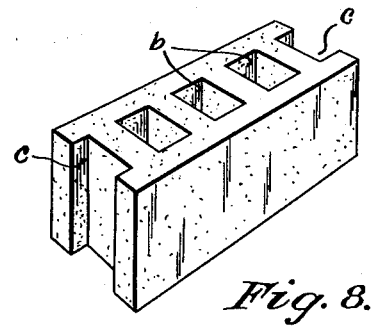
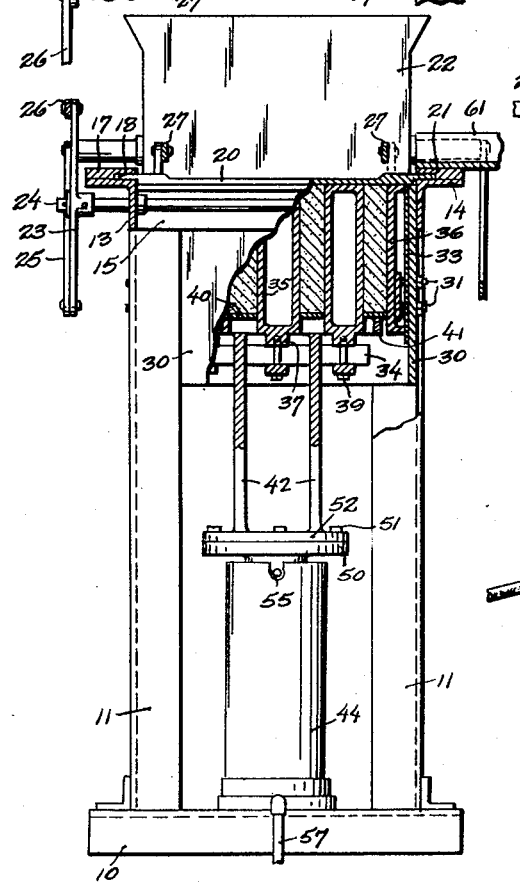

INVENTORS:
George A. Dike
Lawrence E. Thomas
BY Gordon C. Grainger
ATTORNEY.

June 20, 1950   G. A. DIKE ET AL   2,512,092
MACHINE FOR MOLDING CONCRETE BLOCKS
Filed Dec. 29, 1945   3 Sheets-Sheet 3

INVENTORS:
George A. Dike
Lawrence E. Thomas
Gordon C. Grainger

ATTORNEY.

Patented June 20, 1950

2,512,092

UNITED STATES PATENT OFFICE 2,512,092

MACHINE FOR MOLDING CONCRETE BLOCKS

George A. Dike, Lawrence E. Thomas, and Gordon C. Granger, Seattle, Wash.

Application December 29, 1945, Serial No. 638,232

5 Claims. (Cl. 25—41)

This invention relates to the production of concrete building blocks, and is of that nature in which a mix of fairly dry consistency is fed to a mold and, by compounding forces of vibration and pressure, the concrete aggregate compacted into a more dense condition than can be accomplished by simple molding. The object of the present invention is to provide a perfected machine for this purpose which will have an especially high output and which will turn out blocks of better and more uniform shape; which permits the use of a single basic mold characterized by a rigid wall structure for use in producing variously sized standard shapes of blocks and adapts this basic mold to the various sizes simply by insertion of dummy liners; which is of comparatively simple and inexpensive construction and having its parts sturdily built with little likelihood of becoming damaged in use; which admits of being operated with minimum manpower; and which generally is improved by comparison with concrete-block machines as they have been heretofore known.

It is further and more particular object of the invention to provide such a machine as permits the vibrational influence to be transmitted to the concrete mix through the floor of the mold and, as a still further and particular object, the invention aims to engineer a machine in which the molded block is removed from the mold through the instrumentality of elevating the floor.

With the foregoing and other objects and advantages in view, and which will appear and be understood in the course of the following description and claims, the invention consists in the novel construction, adaptation and combination of parts of a machine, as hereinafter described and claimed:

In the accompanying drawings—

Figure 1 is a fragmentary top plan view illustrating a machine constructed in accordance with the now preferred embodiment of the invention.

Fig. 2 is a transverse vertical section taken on the approximate median line of the mold and showing, within the latter, introduced mix in the process of being molded into the form of a building block.

Fig. 3 is a fragmentary longitudinal vertical section on line 3—3 of Fig. 1, likewise showing a building block in process of being molded.

Fig. 8 is a perspective view of a concrete block.

Figure 6:
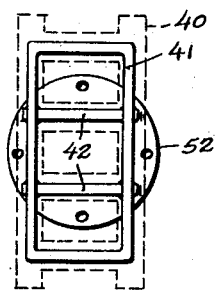
Fig. 6 is a detail top plan view, employing the scale of Figs. 1 through 4, inclusive, to illustrate the rack which acts as a support for the floor of the mold, and employing dotted lines to portray the floor-forming pallet which seats upon the rack.
Figure 7:
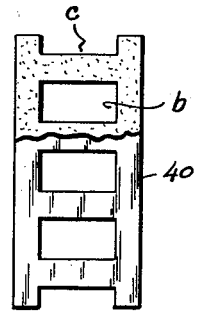
Fig. 7 is a top plan view of the pallet, and showing, fragmentarily, a concrete block resting upon the pallet.

In said drawings, the reference numberal 10 represents base girders, and footing on these girders are uprights which, as shown, comprise central and outlying angle bars, as 11 and 12, respectively, of which the said central bars are, by preference, four in number and placed to describe the four corners of a rectangle which, in areal expanse, somewhat exceeds the largest size of concrete block which it is desired to produce in the machine. Made rigid with the uprights is a head-frame comprising longitudinal stringers 13—14 and cross-members 15 which tie the stringers together, and these stringers and cross-members are so placed as to rest upon the top edges of the central uprights and by their junctions produce angles constituting extensions of the angles of the latter. The cubical space contained within planes projected between aligned flanges of the angle-bar uprights 11 and running from the base girders at the bottom to the upper limit of the head-frame at the top will, for reference purposes, be hereinafter termed the well, and there extends horizontally from the upper lip of this well, and which is to say from one of the two cross-members 15, a solid deck 16.

Running parallel with one another at each side of the head-frame and seating upon the stringers 13 and 14, there is provided a pair of rigid curb or edging strips 17, and each said edging strip has formed in its inner face a horizontally placed slideway 18 arranged to receive tongues 21 of a plate 20 for guiding the latter in reciprocal horizontal movement into and out of a position overlying the well. The inoperative position of this plate, and which serves as a tight cover for the well, is at the end of the head-frame opposite the deck. Normally occupying the deck and employing the latter as its floor is an open-bottom hopper 22 likewise looking to the slideways as a guiding support for reciprocal horizontal movement into and out of a position overlying the well.

Indicated at 23 are levers, one at each side of the head-frame, fulcrumed as at 24 and connected by an arm 25 with the hopper, and operatively engaging the levers to impart movement thereto for shifting the hopper into and out of its forwardly advanced position whereat to effectuate a discharge of the contents into the well or, more especially, into a mold occupying the well and which will be hereinafter described, there are provided control rods 26. These control rods may be either power or hand operated and, similarly actuated either by power or hand, there are provided control rods 27 connecting with the cover plate 20.

Now describing the mold, there are welded or otherwise rigidly secured along the four sides of the well at the head end of the latter respective wall-forming plates 30. Liners are provided for each of these walls and, for clarity in description, these liners are designated 32 and 33, the former referring to the side-wall liners of the mold (side wall in the usual sense of the longer dimension) and the latter referring to the end-wall liners of the mold (end wall in the usual sense of the shorter dimension). The liners serve as the mold's facing walls and, in securing the same in position, the liners 32 are first applied and rest by their lower edge upon a horizontal rib 34 which extends as a fixed projection from the lower part of the related side-wall plate 30, following which the liners 33 are inserted, and these latter liners butt by their ends against the liners 32 and are held in place by bolts 31.

In forming concrete building blocks, it is customary to core the same such as to produce through-openings running top to bottom of the block (see Fig 8), and in addition to inside corings, as $b$, it is usual to provide exposed end corings $c$ which, when laying a severalty of the blocks in their functional end-to-end relation, register the end opening of one block with the end opening of the next adjacent block. To form these inside corings $b$ and the outside corings $c$, the latter, sectionally considered, being one-half the size of the former, the present invention employs full and half-size hollow core members 35 and 36, respectively. The attachment of the half-cores is through the instrumentality of the bolts 31, and are brought firmly to bear one against one and the other against the other of the two end liners 33. For the full-cores 35, there is employed a cross-tie 37 to which the cores are welded or otherwise firmly secured, and this tie spans the width of the mold and seats by its ends upon the ribs 34, being complemented by a second and subjacent cross-member 38 which catches below the ribs and, by bolts 39, clamps the latter. It will be understood that the mold as it is shown in the drawings is expressly intended to produce the largest of several given sizes of concrete building blocks. Where a run of a smaller-size block is desired, smaller in terms either of the length or width, the procedure is to reduce the span between the wall-forming plates 30 by insertion of dummy pieces, and a change in the size and number of the core members, to correspond, is also made. It becomes a simple matter to adapt the mold to the production of substantially any form of block desired within the permitted range of the well, including half as well as full blocks, bull nose, jam and other forms.

Completing the mold is a floor-forming pallet 40, and this pallet, which is particularly characterized in the fact of its being removable and hence allowing the concrete block, following discharge from the mold, to the left upon the pallet during the curing stage, is given a plan configuration very nearly in exact correspondence with the sectional contour of the block for which it is designed, departing therefrom only to this extent, namely, a $\frac{1}{16}$" clearance is provided between the pallet and the mold about the entire perimeter of the former and also between the pallet and the cores.

The pallet finds its support within the mold from a rectangular hoop-like rack 41 of an outside dimension smaller than the mold, and this rack is firmly sustained upon paired stilts 42 which serve to transmit vertical motion from below and lie one at one side and the other at the other side of the clamping bars 37—38. The vertical motion, in more particularity, is both of a vibratory and a lift nature, and these motions are derived one from an air gun and the other from an elevator-piston, both of which are mounted in the base of the well. The preferred assembly utilizes a cup-type piston, as 43, working in a relatively large cylinder 44 and having an inner and concentric cylinder 45 threadedly applied upon the neck of the piston's follower body 46, the air-gun, denoted 47, being stepped upon the said neck and bearing by its head end against the depending anvil-hub 48 of a vibrator block 50. The said hub is given a sliding fit within the inner cylinder 45. Detachable connection, as by bolts 51, is made from the vibrator block to a pedestal 52 integral with the stilts.

Air-gun 47 is a commercially available unit producing an intensive vibratory effect, and is fed from a source of pressure air supply by a pipe 53 connecting with a duct 54 bored through the piston follower 46, this pipe 53 perforce moving with the elevator-piston and to such end extending upwardly as a straight rigid length through the outer cylinder 44 to substantially the upper limit of the latter whence connection is made by an elbow turn with a flexible hose 55. The exhausting of the gun's pressure air is made through a wall-port 56 into the outer cylinder and therefrom to the atmosphere.

Pressure air from the supply source is fed to the underside of the cup-piston 43 through a valved pipe 57, and dumping of pressure air for the urpose of lowering the piston is accomplished by feeding the air back through the pipe 57 to the valve therefor, the latter being of the three-way type customarily employed for this character of work. An elastic bumper 58 cushions the drop of the piston assembly, and springs 59 accomplish a similar end at the top of the piston's elevational travel by their engagement against an abutment-stop 60, this abutment-stop being produced in the form of a partial ring and, in addition to its stop office, acts as a separator between the two cylinders.

Figure 4:
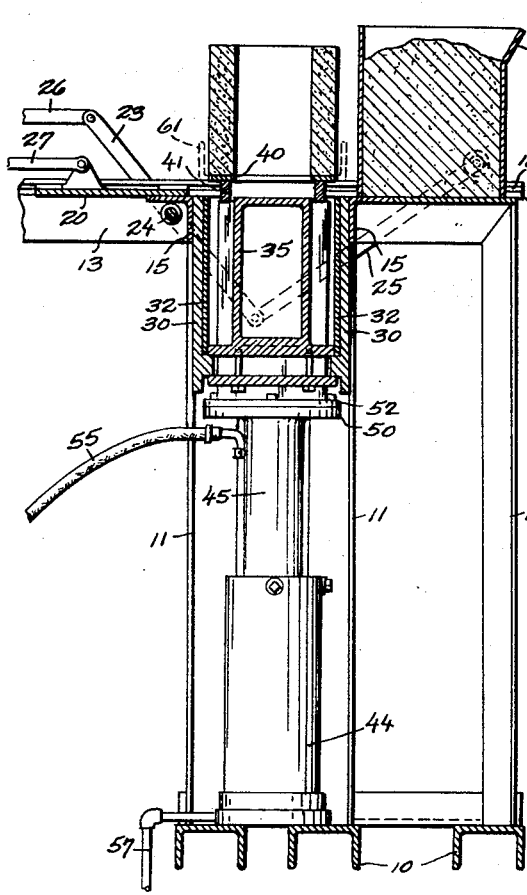
Fig. 4 is a view similar to Fig. 3 excepting that the lift mechanism of the machine is indicated in the position which it occupies when discharging a concrete block from the mold.
Figure 5:
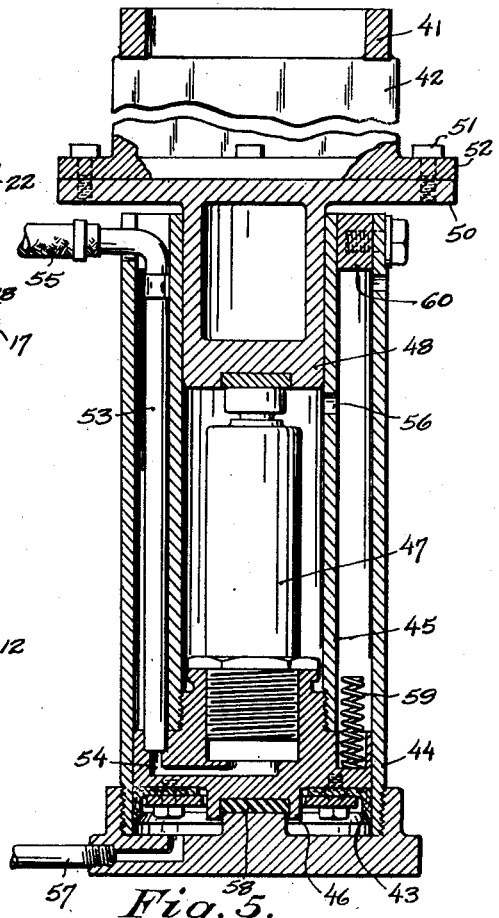
Fig. 5 is a fragmentary longitudinal vertical section taken to an enlarged scale and detailing the mechanism of the machine responsible for the creation, and impartation to the floor of the mold, of vibratory and elevational forces.
Figure 10:
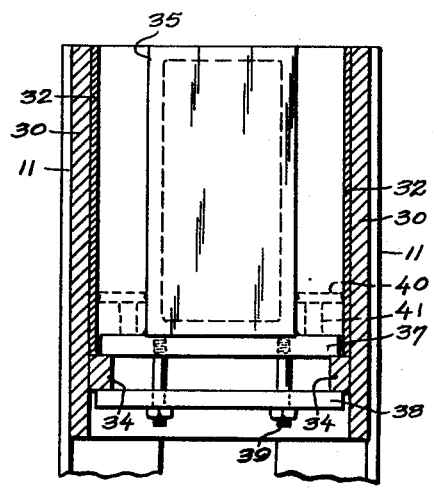
Fig. 10 is a fragmentary vertical sectional view on line 10—10 of Fig. 9.
Figure 9:
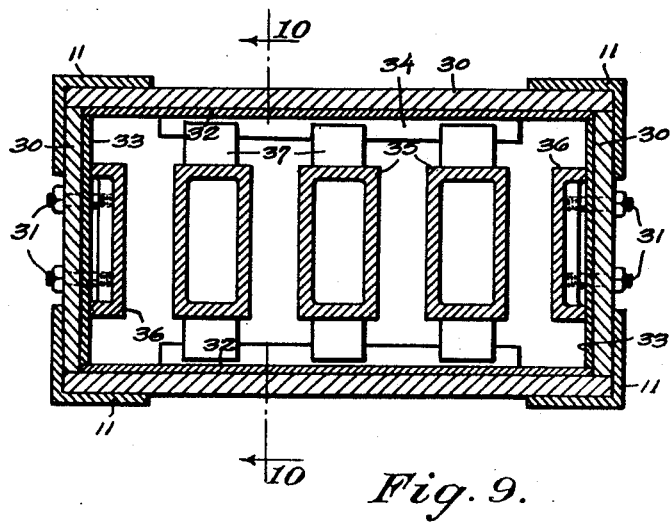
Fig. 9 is an enlarged horizontal section of the mold.

The operation is as follows:

Concrete aggregate in a relatively dry mix is fed from a mixer (not shown) into the hopper 22 which, desirably, has a capacity somewhat better than twice the volume of the mold. A pallet 40 is placed upon the rack 41, and levers 23 are then actuated to draw the hopper over the mold. As the mold fills, the air hammer 47 is caused to be activated for vibrating the rack and its sustained pallet, and the operator then closes the air valve to the hammer and returns the hopper to its inoperative position upon the deck 16, coincidently bringing the cover plate 20 over the mold. The hammer and the elevator-piston are now simultaneously activated to compound the forces of pressure and vibration, a procedure which need extend over a period of from one to two seconds only, and, after relieving the pallet of these forces, the cover plate is slid away from the mold. Piston 43 is now again subjected to the pressure of the air source, and the resulting lift of the rack and its sustained pallet pushes the formed block of concrete upwardly through the open top of the mold into the position shown in Fig. 4, wherefrom the block and the pallet are removed together to a receiving platform 61, whence the same are conveyed in any suitable manner to a curing room, the block remaining upon the pallet until the block has thoroughly set. A new pallet will in the meantime have been placed upon the rack coincident with the step of lowering the latter to the normal operating position of the rack, or which is to say the position normal to the charging of the mix into the mold, and the described operation is repeated. The entire process of inserting the pallet, filling the mold with the concrete mix, vibrating and compressing the contents, and elevating and discharging the molded block from the machine may be carried out with unusual rapidity, giving to the machine an output capacity, per individual mold, appreciably higher than has been heretofore possible.

From the foregoing, it will have been noted that provision is made for reducing the size of the mold chamber both as to length and width. The machine also accommodates itself to a change in the depth of the mold, and which is accomplished by unbolting the pedestal 52 from the vibrator block 50 and introducing therebetween a washer (not shown) of a thickness corresponding to the desired reduction in depth. Assuming that the machine is designed for the production of the most generally employed block, and which is to say an 8–8–16 block, and it is desired to produce a 6–6–12 block, hence calling for a 2" reduction in breadth and depth, and a 4" reduction in length, the operator inserts 1" dummy liners along each side of the mold, 2" dummy liners along each end of the mold, and inserts a washer of 2" thickness between the vibrator block and the pedestal.

It is thought that the nature of the invention, and the manner of its use, will be clear from the foregoing. Departures from the embodiment which I have elected to illustrate will suggest themselves, and no limitations are to be implied from the foregoing description having express reference thereto, it being my intention that all forms of construction and variations in detail coming within the scope of the hereunto annexed claims are to be considered as comprehended by the invention.

What we claim is:

1. In a machine for the production of concrete blocks, in combination: a mold for forming the block and comprising stationary side and end walls, core members fixedly related to said side and end walls, and a pallet serving as a removable floor for the mold and produced to a plan configuration approximating that of the cavity of the mold; a cover for the mold reciprocally slidable into and out of a position overlying the mold; a vertically movable rack arranged and adapted to freely support the pallet thereon; and independently activated means engaging the rack from below, said means being characterized in that each is powered by presure fluid and with the one being contained with the other and operating one to vibrate and the other to exert a lift force upon the rack.

2. In a machine for the production of concrete blocks, in combination: a mold for forming the block and comprising stationary side and end walls, and a pallet movable freely through the cavity of the mold and serving as a floor for the latter; a plate serving as a removable cover for the mold and reciprocally slidable from a position at one side of the mold into and out of covering relation to the latter; a solid deck extending from the other side of the mold as a prolongation of the upper lip of the latter; a hopper for charging the mold with concrete mix and reciprocally slidable independently of the cover plate from a normal position upon the deck into and from overlying relation to the mold; means for vibrating the mold; and means exerting an elevational influence upon the pallet whereby, when the cover overlies the mold, to compress the charged contents and, when the cover is withdrawn, to raise the pallet and eject the formed block of concrete from the open top of the mold.

3. In a machine for the production of concrete blocks, in combination: a mold for forming the block having stationary side and end walls and including, as a floor, a pallet movable freely through the cavity of the mold; a member serving as a cover for the mold and movable into and out of a position overlying the latter; means functionally associated with the mold and acting to exert a vibratory effect to a body of concrete mix charged to the mold; and means independent of the vibrating means operatively interconnected with the pallet and exerting an elevational influence upon the pallet whereby, when the cover member overlies the mold, to compress the charged contents and, when the cover is removed, to raise the pallet and eject the formed block of concrete from the open top of the mold, the vibrating machine being so applied as to constitute a functioning part of the operative interconnection from said elevating means to the pallet.

4. In a machine for the production of concrete blocks, in combination: a mold for forming the block and having stationary side and end walls, a pallet serving as a removable floor for the mold and produced to a plan configuration approximating that of the cavity of the mold, a vertically movable rack arranged and adapted to freely support the pallet thereon, and two independently activated means engaging the rack from below, said means being characterized in that each is powered by pressure fluid and with the one being contained within the other and operating one to vibrate and the other to exert a lift force upon the rack.

5. In a machine for the production of concrete blocks, in combination: a mold for forming the block and comprising stationary side and end walls, core members removably secured to said mold, and a pallet serving as a floor for the mold and produced to a plan configuration approximating that of the cavity of the mold; a pressure source of fluid power; a cylinder-and-piston assembly having a movable piston powered from said pressure source and occupying an upright position below the mold; a vertically movable rack arranged and adapted to freely support the pallet thereon; an operative interconnection from the cylinder-and-piston assembly to the rack for raising the latter to eject from the mold a block of concrete formed therein, said operative interconnection including vibrating means powered from the said pressure source for exerting a vibrating effort to a body of concrete mix charged to the mold; and means for operating the vibrating means independently of the operation of the piston.

GEORGE A. DIKE.
LAWRENCE E. THOMAS.
GORDON C. GRANGER.

REFERENCES CITED

The following references are of record in the file of this patent:

UNITED STATES PATENTS

| Number | Name | Date |
|---|---|---|
| 856,982 | McClintock | June 11, 1907 |
| 1,168,768 | Upham | Jan. 18, 1916 |
| 1,649,731 | Ransohoff | Nov. 15, 1927 |
| 1,777,660 | Dahl | Oct. 7, 1930 |
| 1,937,028 | Lux et al. | Nov. 28, 1933 |
| 2,062,767 | Sexton | Dec. 1, 1936 |
| 2,067,401 | Lassman | Jan. 12, 1937 |
| 2,147,836 | Gaskell | Feb. 21, 1939 |
| 2,270,829 | Wellnitz | Jan. 20, 1942 |
| 2,275,676 | Gelbman et al. | Mar. 10, 1942 |
| 2,324,884 | Seil | July 20, 1943 |
| 2,366,780 | Gelbman et al. | Jan. 9, 1945 |
| 2,389,673 | Lofdahl | Nov. 27, 1945 |